(12) United States Patent
Zelesky et al.

(10) Patent No.: US 6,234,754 B1
(45) Date of Patent: May 22, 2001

(54) COOLABLE AIRFOIL STRUCTURE

(75) Inventors: Mark F. Zelesky, Coventry; Dominic J. Mongillo, Jr., New Britain, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/371,138

(22) Filed: Aug. 9, 1999

(51) Int. Cl.[7] .................................................. F01D 5/18
(52) U.S. Cl. ........................................ 416/97 R; 415/115
(58) Field of Search ............................ 416/96 R, 96 A, 416/97 R, 97 A; 415/115

(56) References Cited

U.S. PATENT DOCUMENTS

| | | |
|---|---|---|
| 4,353,679 | 10/1982 | Hauser ................................. 415/115 |
| 4,601,638 | 7/1986 | Hill et al. ............................... 416/97 |
| 4,752,186 | 6/1988 | Liang ..................................... 416/97 |
| 5,337,805 | 8/1994 | Green et al. .......................... 164/369 |
| 5,368,441 | 11/1994 | Sylvestro et al. ...................... 416/97 |
| 5,378,108 | 1/1995 | Zelesky ................................. 416/97 |
| 5,472,316 | 12/1995 | Taslim et al. .......................... 416/97 |
| 5,498,133 | 3/1996 | Lee ........................................ 416/97 |
| 5,702,232 | 12/1997 | Moore .................................... 416/95 |

*Primary Examiner*—Edward K. Look
*Assistant Examiner*—James M McAleenan
(74) *Attorney, Agent, or Firm*—Gene D. Fleischhauer

(57) ABSTRACT

A coolable airfoil structure having internal heat transfer features through which cooling air is flowed under operative conditions is disclosed. Various construction details and features are developed which affect the castability and core strength during manufacture and strength and cooling effectiveness of the airfoil after manufacture. In one particular embodiment, the airfoil has a plurality of heat transfer members disposed in the rearmost section of the trailing edge region which comprises a single impingement rib, a single row of pedestals and a single row of chordwisely extending flow dividers.

9 Claims, 5 Drawing Sheets

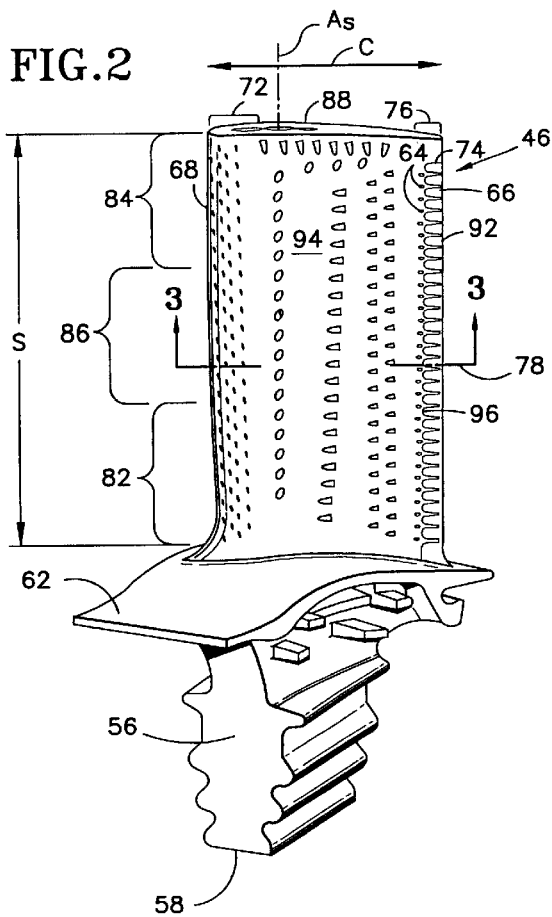
FIG. 2
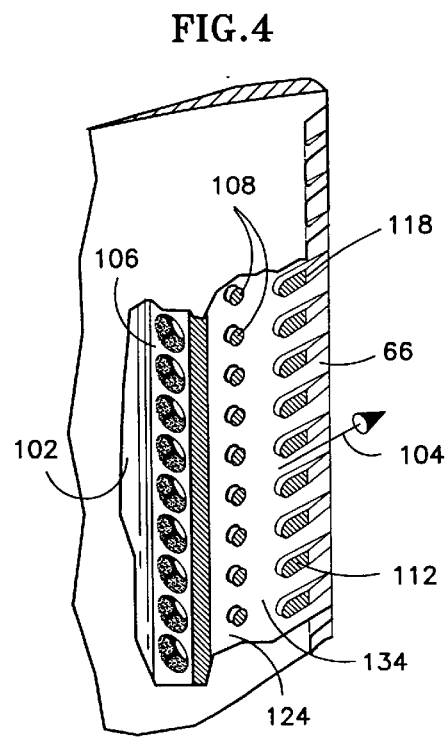
FIG. 4
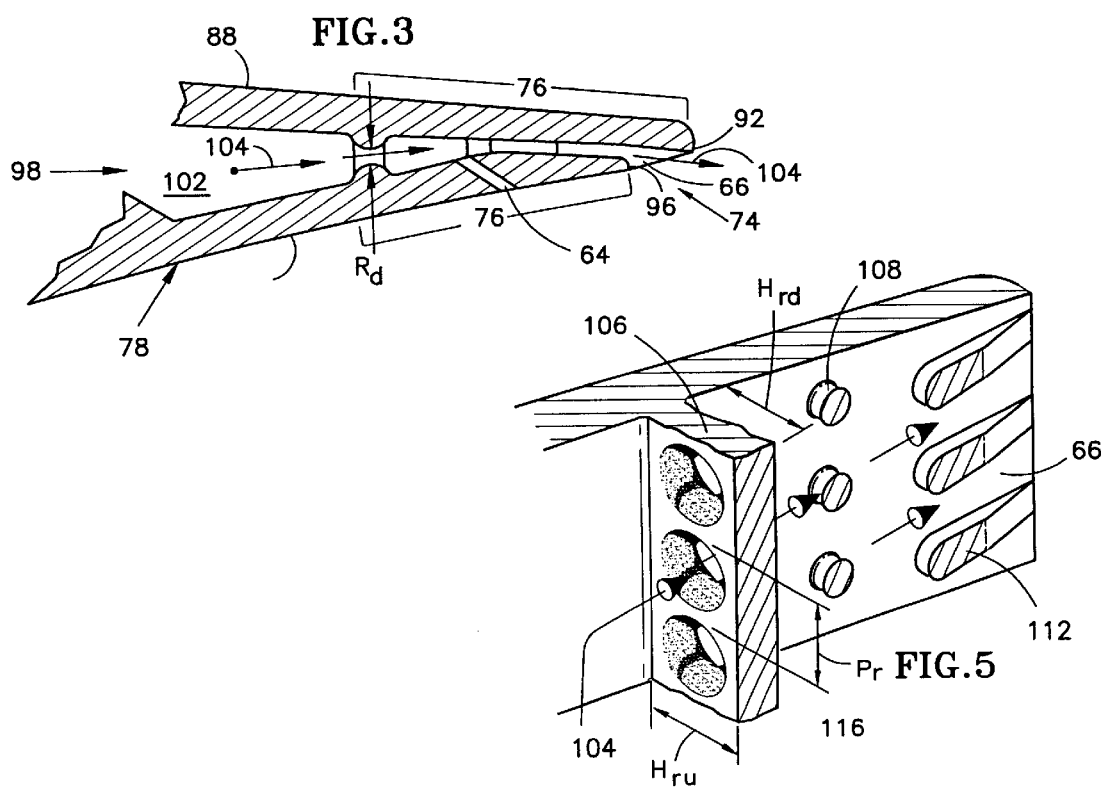
FIG. 3
FIG. 5

COOLABLE AIRFOIL STRUCTURE

TECHNICAL FIELD

This invention relates to coolable airfoil structures of the type used in high temperature rotary machines, and more specifically, to heat transfer elements in the trailing edge region of such airfoils. The concepts disclosed have application to airfoils for turbine vanes and for turbine bleeds.

BACKGROUND OF THE INVENTION

An axial flow rotary machine, such as a gas turbine engine for an aircraft, has a compression section, a combustion section, and a turbine section. An annular flow path for working medium gases extends axially through the sections of the engine. The gases are compressed in the compression section to raise their temperature and pressure. Fuel is burned with the working medium gases in the combustion section to further increase the temperature of the hot, pressurized gases. The hot, working medium gases are expanded through the turbine section to produce thrust and to extract energy as rotational work from the gases. The rotational work is transferred to the compression section to raise the pressure of the incoming gases.

The compression section and turbine section have a rotor which extends axially through the engine. The rotor is disposed about an axis of rotation Ar. The rotor includes arrays of rotor blades which transfer rotational work between the rotor and the hot working medium gases. Each rotor blade has an airfoil for this purpose which extends outwardly across the working medium flow path. The working medium gases are directed through the airfoils. The airfoils in the turbine section receive energy from the working medium gases and drive the rotor at high speeds about an axis of rotation. The airfoils in the compression section transfer this energy to the working medium gases to compress the gases as the airfoils are driven about the axis of rotation by the rotor.

The engine includes a stator disposed about the rotor. The stator has an outer case and arrays of stator vanes which extend inwardly across the working medium flowpath. The outer case extends circumferentially about the working medium flow path to bound the flow path. The stator has seal elements for this purpose, such as a circumferentially extending seal member which is disposed radially about the rotor blades. The seal member is in close proximity to the tips of the rotor blades to form a seal that blocks the leakage of working medium gases from the flowpath.

The arrays of stator vanes are disposed upstream of the arrays of rotor blades in both the compression section and turbine section. The stator vanes each have an airfoil for guiding the working medium gases to the rotor blades as the gases are flowed along the flow path. The airfoils of the stator vanes and the rotor blades are designed to receive, interact with and discharge the working medium gases as the gases are flowed through the engine.

As a result, the airfoils are bathed in hot working medium gases during operation of the rotor blades causing thermal stresses in the airfoils. These thermal stresses affect the structural integrity and fatigue life of the airfoil. In addition, rotational forces acting on the rotor blade cause additional stresses in the rotor blade, such as mechanical stresses, as the rotor blade is driven about the axis of rotation.

One way to reduce stresses in rotor blades downstream of the combustion section in the high pressure turbine is to cool the rotor blades by flowing cooling fluid through the airfoil. The cooling fluid removes heat from the airfoil decreasing thermal stresses and avoiding unacceptably high temperatures for the material used for the walls of the airfoil. Each rotor blade has one or more openings at its inner end for receiving the cooling air.

One source of cooling fluid is working medium gases from the compression section (pressurized air). The fluid bypasses the combustion process and is at a much lower temperature than the working fluid in the turbine section. The cooling fluid is flowed through and around various structures within the turbine section.

The use of such a cooling fluid has a negative impact on the aerodynamic efficiency of the gas turbine engine. This occurs because the compressed cooling fluid bypass the combustion section where energy is added to the fluid and enters the flowpath with little transfer of useful energy from the compressed fluid to the turbine stages. The loss of efficiency is balanced by increased durability of the parts and higher combustion temperatures that increase cycle efficiency. This balancing emphasizes the need to use efficiently the cooling fluid drawn from the compressor section.

The turbine airfoils have complex internal passages for receiving and discharging the cooling fluid. As the cooling fluid passes through these passages, heat is transferred from internal surfaces to the cooling fluid. The surfaces include surfaces on heat transfer members, such as trip strips and pedestals, to increase heat transfer between the cooling fluid and the turbine airfoil. The cooling fluid then exits into the flow path through cooling holes distributed about the airfoil.

An example of such a rotor blade is shown in U.S. Pat. No. 4,474,532 entitled "Coolable Airfoil For a Rotary Machine", issued to Pazder and assigned to the assignee of this application. Another example of a coolable rotor blade is shown in U.S. Pat. No. 4,278,400 issued to Yamarik and Levengood entitled "Coolable Rotor Blade" and assigned to the assignee of this application. Each of these rotor blades is provided with a plurality of cooling air passages on the interior of the blade. Cooling air is flowed through the passages to the rearmost portion of the rotor blade, commonly referred to as the trailing edge, from whence the cooling air is exhausted into the working medium flowpath.

U.S. Pat. No. 5,368,441 issued to Sylvestro entitled "Turbine Airfoil Including Diffusing Trailing Edge Pedestals" has a plurality of flow dividers (teardrop shaped pedestals) in the trailing edge region of the blade. The pedestals place the interior of the airfoil of the rotor blade in flow communication with the exterior of the blade. The flow of cooling fluid directly cools the interior of the blade by impingement on the internal surfaces and convection as the flow proceeds through cooling channels. The trailing edge is cut back on the pressure side to uncover a diffusing region at the end of the flow dividers. A channel is formed between the flow dividers to diffuse cooling air over the suction surface of the airfoil and provide a film of cooling air over the suction wall. The film cooling is effective but its effectiveness decreases if the flow separates from the walls of the diffusing section and turbulently mixes with the hot working medium gases.

Other constructions have a plurality of pedestals in the trailing edge region to increase heat transfer. Increasingly intricate constructions have been formed by casting the airfoil with a lost wax process. These constructions may be formed upstream of flow dividers at the trailing edge of the airfoil but in close proximity to increase heat transfer to the cooling fluid. These include constructions in which pairs of spanwisely extending ribs in the trailing edge region have a plurality of spanwisely spaced orifices for directing cooling air on adjacent internal structure. Impingement cooling results improving heat transfer in the trailing edge of the airfoil. The ribs in such constructions are relatively small in the chordwise direction but relatively long in the spanwise direction. The small orifices when coupled with the need during the casting process to have wax where metal will form and core material (slurry) only where the small orifices are formed in the casting results in only small amounts of core material being disposed in the rib location of the casting core.

The ribs may cause difficulties during the casting process. During the casting process of such an airfoil, the ceramic core (which defines the openings and structure in the trailing edge region) is disposed on the interior of an airfoil shaped mold. Molten metal is poured around the core, rushing into the mold during the pouting process. The molten metal fills openings in the core to form solid structure and flows around the solid ceramic core material to form holes, such as the orifices in the ribs. As the molten metal enters the structure, portions of the core in the trailing edge region where the heat transfer elements are intricate and delicately formed, may collapse resulting in an unusable casting. Accordingly, the complexity of the heat transfer members is balanced by the need to cast these features.

The above notwithstanding, scientists and engineers working under the direction of Applicants Assignee have sought to develop a cooling constructions for the trailing edge region of a rotor blade which have acceptable castability during manufacture and have acceptable levels of stress under operative conditions.

SUMMARY OF INVENTION

This invention is in part predicated on the recognition that rotational forces in a rotor assembly and the acceleration of cooling fluid radially inwardly during rotation may be used to increase the rate of diffusion of cooling passages in the trailing edge region of the rotor blade.

According to the present invention, flow divider sidewalls bounding a diffusing section in the trailing edge region of a rotor airfoil are provided with an angle of diffusion a on the inwardly facing sidewall that is greater than the angle of diffusion β on the outwardly facing sidewall.

In accordance with one embodiment of the present invention, the angled sidewalls form a channel which is partially covered and partially uncovered by a cutback trailing edge configuration.

In accordance with one detailed embodiment, the diffusion angle for the inwardly facing surfaces is slightly greater at a second, spanwisely outer flow divider than a first spanwisely inner flow divider.

A primary feature of the present invention is a diffusion passage bounded by converging sidewalls on adjacent flow dividers. A primary feature is the angle of convergence a for the first converging side wall. Another feature is the angle of convergence ☐ for the outwardly facing sidewall on the adjacent flow divider. In one particular embodiment, the sidewalls extend from a constant area section of the flow divider. In another embodiment, the angle of diffusion lies in a range from two degrees to fifteen degrees for the inwardly facing wall and in a range of one degree to ten degrees for the outwardly facing sidewall.

A primary advantage of the present invention is the durability and thermomechanical performance of the airfoil which results from a spanwisely thinner flow divider having less mass between converging sidewalls for a given amount of diffusion of the different angles of diffusion than a similar construction having equal angles of diffusion (angle of convergence) for the outwardly and inwardly facing sidewalls. Another advantage is the rate of heat transfer which results from the thinner wall of the downstream portion of the flow divider acting as a more efficient fin to remove heat from the pressure wall and the suction wall and transfer the heat to cooling fluid in channels bounded by the sidewall. Still another advantage is the durability and level of thermal gradients during transient conditions between the pressure and suction walls and the flow divider as compared to constructions which have thicker flow dividers.

The foregoing features and advantages of the present invention will become more apparent in light of the following detailed description of the best mode for carrying out the invention and accompanying drawings.

BRIEF DESCRIPTION OF THE DRAWINGS

FIG. 2 is a perspective view of a rotor blade from the turbine section of the gas turbine engine shown in FIG. 1.

FIG. 3 is a cross-sectional view through a portion of the trailing edge region of the rotor blade shown in FIG. 2 taken along the line 3—3 in the midspan region of the airfoil.

FIG. 4 is a perspective view of the trailing edge region of the rotor blade shown in FIG. 3 with portions of the suction wall and pressure wall broken away.

FIG. 5 is a partial perspective view of corresponding to the view shown in FIG. 4 from a different perspective and with the pressure wall broken away.

BEST MODE

Figure 1:
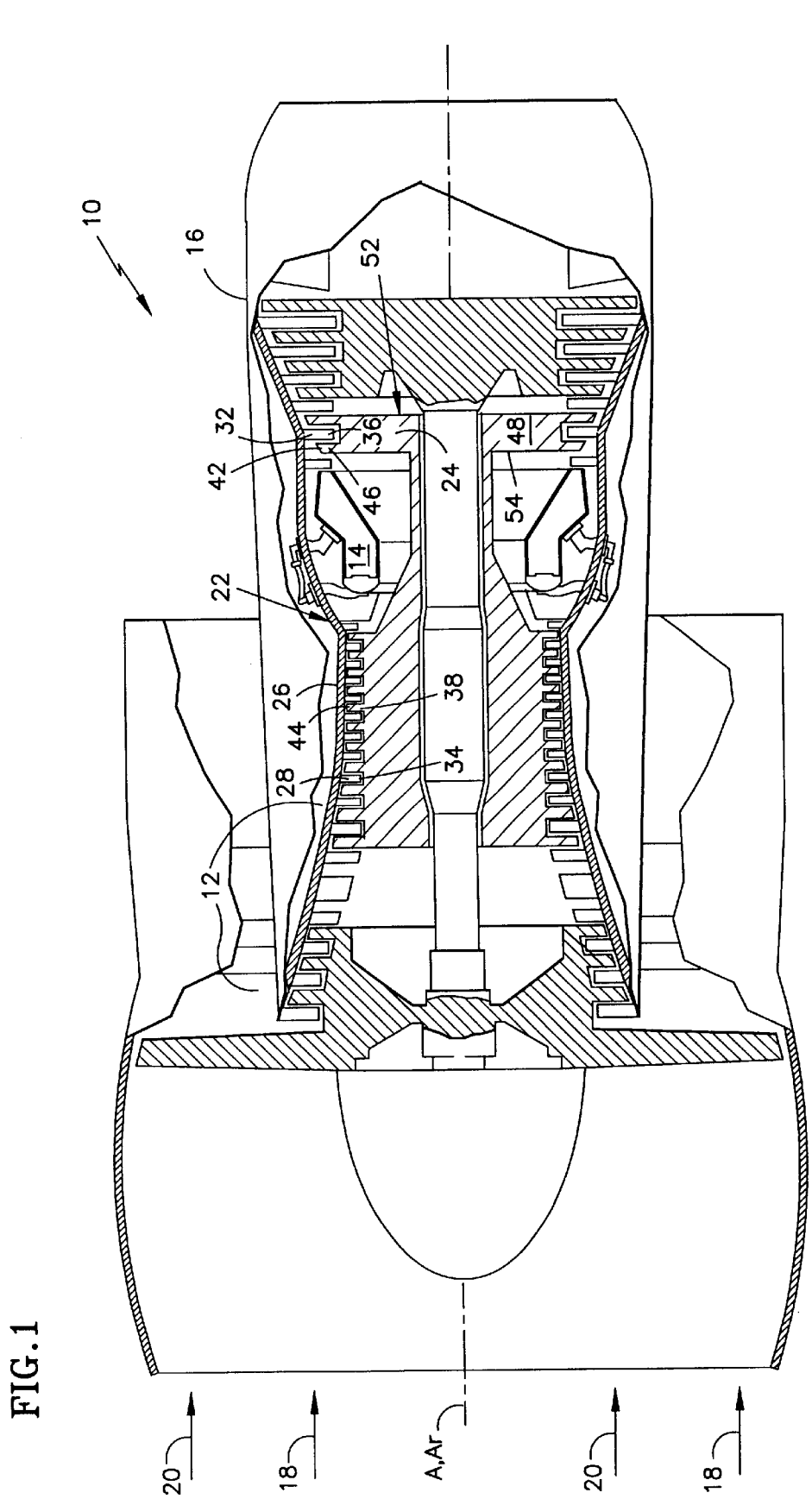
FIG. 1 is a schematic side elevation view of a gas turbine engine with portions of the engine broken away to show the compression section and turbine section of the engine.

FIG. 1 is a schematic, side elevation view of a rotary machine 10, such as a turbofan gas turbine engine. The engine is disposed about an axis of symmetry A and has an axis of rotation Ar. The engine includes a compression section 12, a combustion section 14, and a turbine section 16. An annular, primary flowpath 18 for working medium gases extends axially through the sections of the engine. A by-pass flowpath 20 is outward of the primary flow path.

The engine is partially broken away to show a stator 22 and a rotor 24 in the compression section 12 and the turbine section 16. The stator 22 includes having an outer case 26 which extends circumferentially about the primary flowpath. The stator includes arrays of stator vanes, as represented by the stator vane 28 in the compression section and the stator vane 32 in the turbine section. Each stator vane has an airfoil 34, 36 which extends inwardly from the outer case to direct the flow of working medium gases as the gases pass through the compression section and the turbine section.

The rotor has arrays of rotor blades, as represented by the rotor blade 38 in the compression section 12 and the rotor blade 42 in the turbine section 16. Each rotor blade has an airfoil 44, 46 which extends radially outwardly across the working medium flow path into close proximity with the stator 22. In the turbine section, the rotor has a rotor assembly 48 which includes a rotor disk 52. The rotor blades engage the rotor disk and are carried by the disk about the axis of rotation Ar.

FIG. 2 is a perspective view of the rotor blade 42 from the high pressure portion of the turbine section 16. The rotor blade is disposed about a spanwisely extending axis As. The turbine blade has a root 56 having an opening 58. The opening adapts the airfoil 46 to be in flow communication with a source of cooling air under operative conditions. Each rotor blade has a platform 62 outwardly of the root. The platform inwardly bounds the working medium flowpath 18. The airfoil has an opening (not shown) which adapts the airfoil to receive cooling air from the root of the rotor blade. Cooling passages (not shown) extend internally of the airfoil and are in flow communication with the exterior of the airfoil through openings, as represented by openings such as the film cooling holes 64 and the channels 66 in the exterior of the airfoil.

The airfoil has a leading edge 68, a leading edge region 72, a trailing edge 74, and a trailing edge region 76. A plurality of airfoil sections, as represented by the airfoil section 78, are disposed chordwisely about the spanwise axis As to define the contours of the airfoil (as used herein, plurality means an indefinite number of two or more). The airfoil has a chordwise direction C and a spanwise direction S that provide reference directions. The spanwise direction is generally perpendicular to the axis of rotation Ar. The spanwise extent of the airfoil is divided into an inner portion 82, an outer portion 84, and a midspan portion 86 that extends spanwisely from the inner portion to the outer portion. The inner portion typically ranges from the platform to about the thirty percent (30%) span location of the airfoil, the midspan portion ranges from about the thirty percent (30%) span location to the seventy percent (70%) span location, and the outer or tip portion ranges from the seventy percent (70%) span location to the tip of the airfoil.

The airfoil 46 has a suction wall 88 extending chordwisely and spanwisely about the back side of the airfoil. The suction wall extends from the leading edge region 72 to the trailing edge region 76. The suction wall has a suction wall lip 92 disposed in the trailing edge region. The airfoil has a pressure wall 94 extending chordwisely and spanwisely about the opposite side (front side) of the airfoil. The pressure wall extends from the leading edge region to the trailing edge region.

FIG. 3 is a sectional view of the rotor blade 42 shown in FIG. 2 with portions of the rotor blade broken away except for the trailing edge region 76 and for structure adjacent the trailing edge region. As shown in FIG. 2 and in FIG. 3, the pressure wall 94 has a pressure wall lip 96 which is chordwisely (axially) upstream of the suction wall lip 92. The pressure wall lip and the suction wall lip define a cutback trailing edge The pressure wall is spaced laterally from the suction wall 88 leaving an internal cavity 98 for cooling fluid therebetween. The cavity is in flow communication with the opening for cooling fluid in the root through the internal opening in the airfoil. A spanwisely extending passage 102 ducts the flowpath 104 for cooling fluid in the spanwise direction. The spanwisely extending flowpath supplies cooling fluid to the trailing edge 74 after the flowpath turns chordwisely into the trailing edge region 76.

FIG. 3, FIG. 4. and FIG. 5 show the relationship of the pressure and suction walls 88, 94 to structural heat transfer members in the trailing edge region. The heat transfer members are represented by a rib 106, an array of pedestals 108, and an array of flow dividers 112. The airfoil section 78 is taken in the midspan portion 86 of the airfoil. A plurality of airfoil sections disposed about the spanwise axis As define the contour of the airfoil.

FIG. 4 is a perspective view partially broken away of the trailing edge region. FIG. 5 is a schematic perspective view corresponding to FIG. 4. The pressure wall is broken away in FIG. 5 to show the relationship of the heat transfer members to the suction wall in the midspan portion of the airfoil.

FIG. 3 and FIG. 4 show the internal passage 102 which extends spanwisely in the airfoil and which has the spanwisely extending flowpath 104 for cooling fluid. The trailing edge region 76 is the portion of the airfoil that receives the spanwisely flowing cooling fluid and directs the fluid rearwardly in the chordwise direction to the trailing edge 74. In the installed condition, the chordwise direction with respect to the engine is generally axial. Thus, a trailing edge region extends rearwardly from the location at which the flow becomes chordwise to the trailing edge.

The heat transfer members 106, 108, 112 extend laterally to join the suction wall 88 to the pressure wall 94. As shown, the structural heat transfer members disposed in the trailing edge region also bound the trailing edge region. These three rearmost members 106,108,112 of the airfoil include the single rib 106 which extends spanwisely in the trailing edge region. The rib extends laterally from the suction wall to the pressure wall. The rib has a leading edge 114 and a trailing edge 116. The rib has an upstream height Hru, a downstream height Hrd and an average height Hr. The rib has a plurality of orifices 118 having an inner diameter Rd extending therethrough. The orifices are bounded by a curved surface 122. The curved surfaces are somewhat similar to the inner curved surface of a torus. The orifices are spaced spanwisely by a distance Pr leaving rib material extending therebetween. The orifices are spaced laterally from the walls leaving rib material extending between the walls and the openings.

Figure 6:
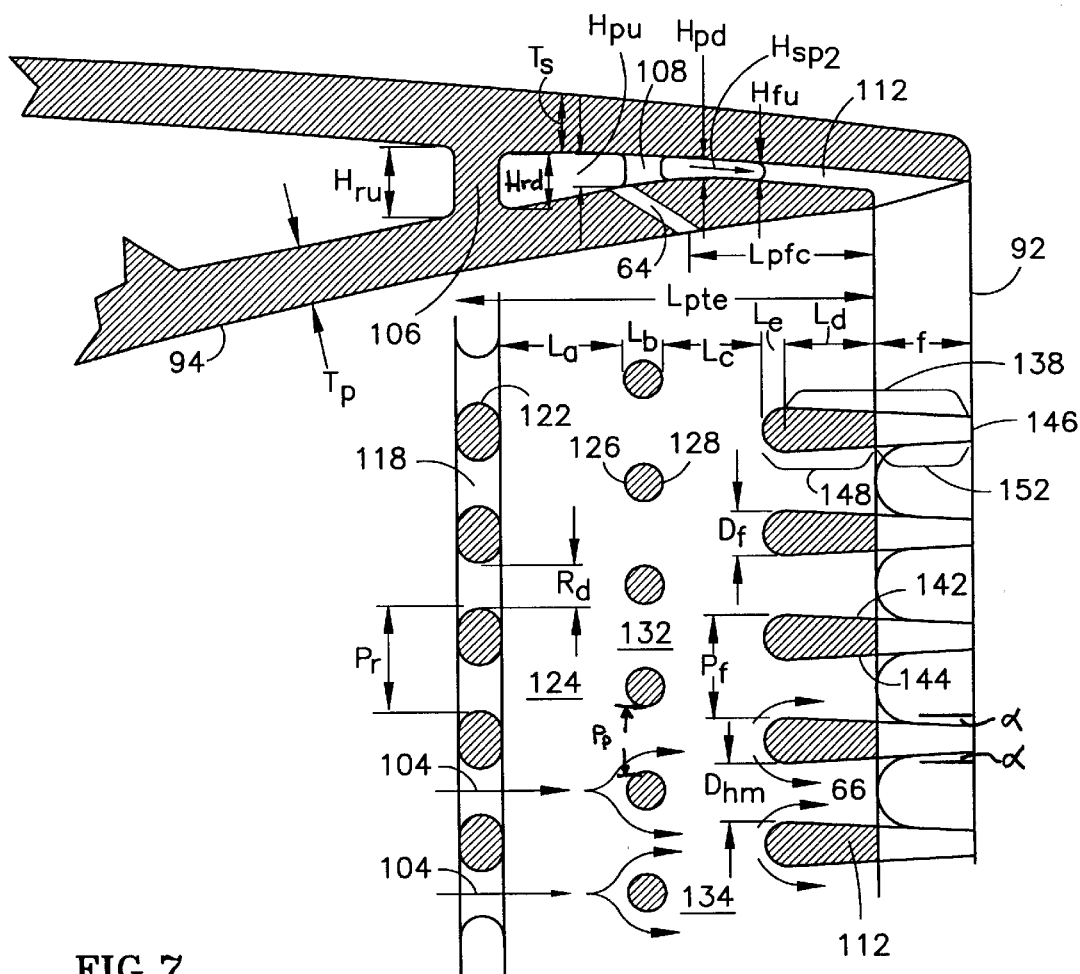
FIG. 6 is a cross-sectional view corresponding to the view shown in FIG. 3 with a plane view taken along the lines 6—6 of FIG. 3.

FIG. 6 shows an enlarged view of the portion of the trailing edge region shown in FIG. 3 and a plan view taken along the line 6—6 of FIG. 3. As shown in FIG. 5 and FIG. 6, the single array of pedestals 108 is spaced chordwisely from the rib 106 leaving a first chordwisely extending supply passage 124 for cooling fluid therebetween. The array of pedestals extends spanwisely in the airfoil. Each pedestal extends from the pressure wall 94 to the suction wall 88 to join the walls. Each pedestal has a leading edge 126 and a trailing edge 128. Each pedestal is spaced spanwisely by a distance Pp from the adjacent pedestal leaving an opening 132 therebetween. The opening between pedestals extends chordwisely between the pedestals and from the suction wall to the pressure wall. Each pedestal has an upstream height Hpu, a downstream height Hpd and an average height Hp.

The plurality of film cooling holes 64 extend from the exterior of the airfoil through the pressure wall 94 to the first supply passage 124. This places the interior of the airfoil in flow communication with the exterior to provide a film of cooling air outwardly of the pedestals in a region of increased thickness for the pressure wall.

The array of flow dividers 112 is disposed in the cutback trailing edge and is spaced chordwisely from the pedestals 108. This leaves a second chordwisely extending supply passage 134 between the pedestals 108 and the flow dividers. Cooling channels 66 are disposed between adjacent flow dividers and provide fluid communication between the trailing edge region 76 of the rotor blade and the flowpath 18. Each of the flow dividers is teardrop shaped in cross-section. Each of the flow dividers has a rounded leading edge 136 and an axially converging section 138. The rounded leading edge faces chordwisely inward toward the second supply passage 134. As shown in FIG. 6. the rounded leading edge is a semicircle in cross-section having a diameter Df. In the embodiment shown, the leading edge forms an upstream portion of the flow divider and terminates at a downstream edge 139 along the flat part of the semicircle. Other non-circular blunt shapes may be equally applicable to the leading edge of the flow dividers.

The axially converging section 138 of the flow dividers includes a pair of converging sidewalls 142, 144, each of which extends from the downstream end 139 of the upstream portion. The pair of converging sidewalls is represented by a first inwardly facing sidewall 144 and a second outwardly facing sidewall 142.

The converging walls nearly converge at their downstream end 146 with the opposing angled side. As shown in FIG. 4, FIG. 5, and FIG. 6, the converging sidewalls do not completely converge to a point but approach each other. The angled sides or sidewalls of adjacent flow dividers cooperate with the pressure wall 94 and suction wall 92 to define a covered diffusing section 148 between adjacent flow dividers. The angle α at which each of the walls converges is also the angle of diffusion for the flow and for the channel 66. The angle α and the suggested magnitude which lies in a range of two degrees to twelve degrees, was discussed at length in U.S. Pat. No. 5,368,441 issued to Sylvestro entitled "Turbine Airfoil Including Diffusing Trailing Edge Pedestals" the disclosure of which is incorporated herein by reference.

The covered diffusing section 148 begins upstream of the pressure wall lip 96 and extends downstream between the pressure wall and the suction wall. An uncovered diffusing section 152 is defined by the angled sidewalls and the suction wall. The uncovered diffusing section extends downstream of the pressure wall lip 96 and to the suction wall lip 92. The uncovered diffusing section of the flow dividers has a length Lf extending rearwardly from the pressure wall lip.

The length Lf of the uncovered diffusing section 152 and the minimum hydraulic diameter Dhm of the channel 66 are closely related to the heat transfer requirements of the trailing edge region 76. These two dimensions may be used to non-dimensionalize the physical relationships of the heat transfer members in the trailing edge region.
The hydraulic diameter of a section is defined as Dhm= (4*A)/P, that is, four times the flow area of the section divided by the perimeter, where Dhm is the minimum diameter at the section, A is the cross-sectional area of the channel, and P is the perimeter of the channel. The location of the minimum hydraulic diameter is at a section generally perpendicular to the flow. In this embodiment with a circular leading edge, the section passes through the center of each semicircle defining the leading edge 136 of two adjacent flow dividers.

The length Lf of the flow divider in the uncovered diffusing section 152 is less than or equal to five times the minimum hydraulic diameter Dhm.

The length Lf of the flow divider in the uncovered diffusing section may possibly be shorter depending on the angle of diffusion. The length is suggested to lie in a range of three to four times the minimum hydraulic diameter Dhm (3 Dhm≦Lf≦4 Dhm). Alternate embodiments are discussed in FIG. 8 and FIG. 9 which have the potential for decreasing the length Lf.

The spanwisely extending part of the flowpath for cooling fluid 104 in the spanwise supply passage 102 is bounded by the leading edge 114 of the rib 106. The trailing edge region extends from the leading edge of the rib to the suction wall lip and such that the heat transfer members are coextensive with the trailing edge region. The total length of the trailing edge region Lpte as measured from the pressure wall lip (pressure wall trailing edge) is less than five times the length Lf of the uncovered diffusing section 152 or less than six times the length Lf as measured from the suction wall lip.

Figure 7:
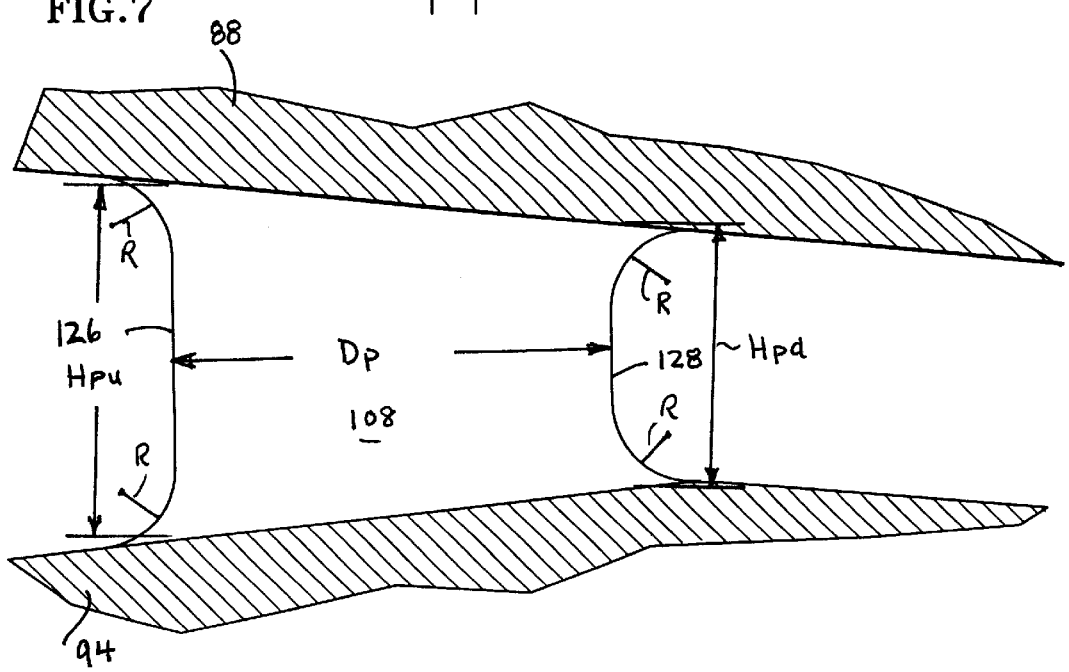
FIG. 7 is a side elevation view of a pedestal from an array of pedestals shown in FIG. 3, FIG. 4, and FIG. 5.

FIG. 7 is a side elevation view of the pedestal 108 shown in FIG. 6. The leading edge 126 has a cylindrically shaped portion 154 which extends approximately eleven mils (0.011 inches). The cylindrically shaped portion transitions into a blend radius of about five mils (0.005 inches). At the trailing edge 128, the cylindrical portion has decreased in height to approximately four mils (0.004 inches) with the blend radius of about five mils (0.005 inches). Accordingly, the lateral height of the pedestal is less than the adjacent blend radius. The height of the pedestal at the leading edge is about twenty mils (0.020 inches) and at the trailing edge about fifteen mils (0.015 inches). The pedestal has a diameter of twenty-five mils (0.025 inches) as measured perpendicular to the cylindrical portion of the pedestal.

In the embodiment shown in FIG. 3, the rib 106 has a height of Hru 51 mils (0.051 inches) and a height of 44 mils (0.044 inches) Hrd at the trailing edge. The axial or chordwise thickness of the rib is 30 mils (0.030 inches). The diameter Rd of the orifice 118 is 32 mils (0.032 inches). The spanwise spacing between the openings is 73 mils (0.073 inches). The first supply passage 124 has a chordwise length La of 87 mils (0.087 inches). The pedestals are spaced apart by a distance Pp of 73 mils (0.073 inches). The length Lb is the diameter of the pedestals and is 25 mils (0.025 mils). The second supply passage 134 for supplying cooling fluid to the flow dividers 112 has a length Lc of 72 mils (0.072 inches). The flow dividers have a leading edge that has a diameter Df of 31 mils (0.031 inches). The covered diffusing section 148 has a length Lc of 77 mils (0.077 inches) over which the converging sidewalls 142, 144 are covered. The length Lf of the uncovered diffusing section 152 is equal to 66 mils (0.066 mils). The minimum hydraulic diameter Dhm of channel 66 is about 19 mils (0.019 inches) in the midspan portion 86 of the airfoil 46. The suction wall has a thickness Ts which ranges from about forty three mils (0.043 inches) at the rib 106 to about forty mils (0.040 inches) at the pedestals 108 and thirty five mils at the flow dividers 112. The pressure wall 94 has a thickness of about thirty mils (0.038 inches) at the rib 106, forty mils (0.040 inches) at the pedestals 108, and a much thinner twenty-nine mils (0.029 inches) at the flow dividers 112.

Figure 8:
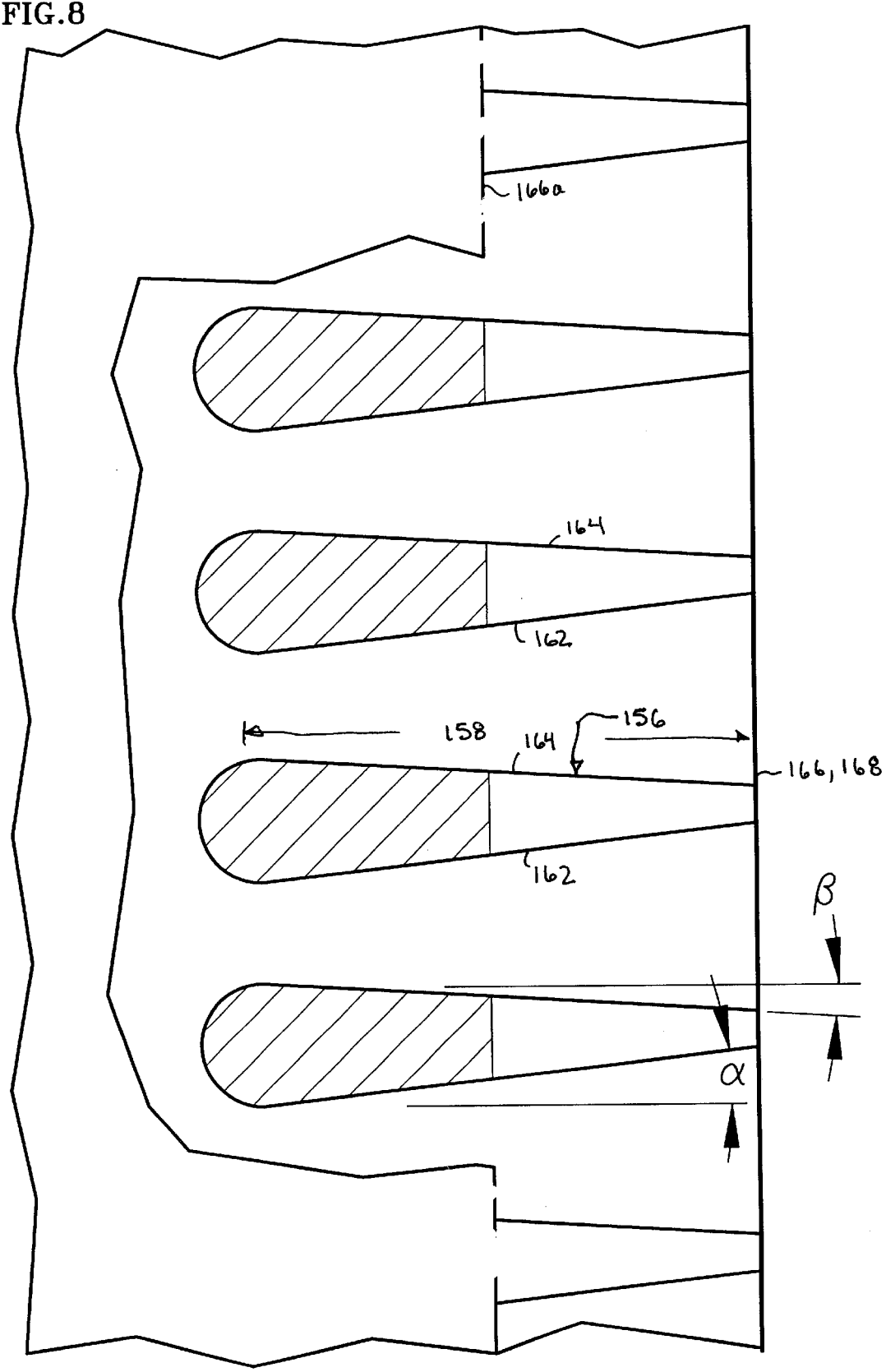
FIG. 8 is an alternate embodiment of the flow divider shown in FIG. 3 and FIG. 6.

FIG. 8 shows an alternate embodiment 156 of the flow dividers 112 and is shown in a converging diffusing section 158. The pair of converging sidewalls 162,164 are converging in the downstream direction such that spanwisely facing sidewalls of adjacent dividers diverge to define the diffusing section 158 between adjacent dividers. Each flow divider has a first converging sidewall 162 which faces spanwisely inwardly. The first converging sidewall is angled away from the direction of flow between flow dividers with an angle α as measured with respect to a line parallel to the axis of rotation Ar. In the embodiment shown, the angle α might also be measured measured with respect to a reference line perpendicular to a spanwise line connecting the centers of the leading edge circle. A second converging sidewall faces spanwisely outwardly. The second converging sidewall is angled away from the direction of flow between flow dividers with an angle β as measured with respect to a line parallel to the axis Ar. The angle α of the inwardly facing sidewall is greater than the angle β of the outwardly facing sidewall. The suggested magnitude for the diffusing angle α of the flow divider 156 lies in a range of about two (2) degrees to about fifteen (15) degrees (2°≦α≦15°). The angle β of the outwardly facing second converging sidewall lies in a range of one degree to twelve degrees (1°≦β<12°). The range of the diffusion angle is due to the relationship of the angle α and the angle β and is discussed below.

The pressure wall lip 166 is aligned with the suction wall lip 168. Thus, the diffusing section extends from upstream to at least one of the lips. In an alternate embodiment, the pressure wall lip might be upstream of the suction wall lip as shown by the broken lines 166a to form a cutback trailing edge.

Figure 9:
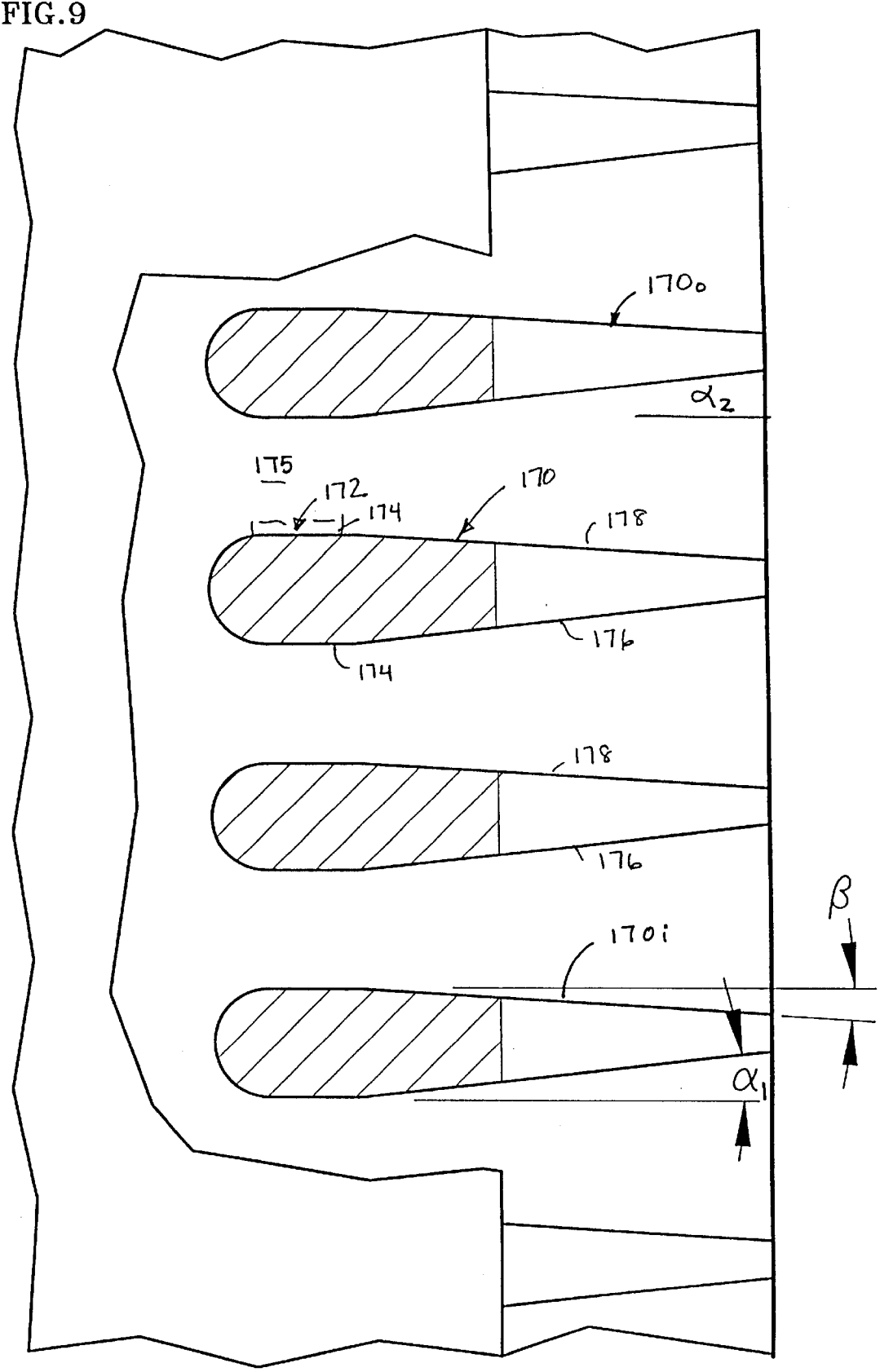
FIG. 9 is an alternate embodiment of the flow divider shown in FIG. 8.

FIG. 9 is an alternate embodiment 170 of the flow dividers 156 shown in FIG. 8. The flow divider 170 has a constant thickness section 172. The constant thickness section includes a pair of parallel sidewalls 174 which are radially spaced from each other. Each of the parallel sidewalls is also radially spaced from and parallel to a parallel sidewall of an adjacent flow divider. The parallel sidewalls of adjacent flow dividers, in conjunction with the pressure wall and suction wall, define constant area channels 176 of constant width between the flow dividers.

The converging section of the flow dividers includes a pair of converging sidewalls 176, 178. In this embodiment, the angle α2 of the radially outer flow divider 178o is slightly greater than the angle α1 if the radially inner flow divider 170i.

During operation of the gas turbine engine shown in FIG. 1, hot working medium gases are flowed along the working medium flowpath 18 over the airfoil 46. Cooling fluid is flowed through internal passages to cool the airfoil. The cooling fluid follows flowpaths for cooling fluid, such as the flowpath 104 in passage 102. A portion of this cooling fluid is ejected rearwardly through the cutback trailing edge 74, again along flowpath 104, and into the flowpath 18. The passage 102 acts as a manifold during this process for the trailing edge region 76, ducting cooling fluid outwardly and distributing the cooling air to the rib 106.

The cooling fluid enters the orifices 118 of the rib 106 which increases the velocity and the turbulence to the flow. The hydraulic diameter of the flow path decreases and the heat transfer coefficient increases as the fluid passes through the rib. Heat is transferred from the rib to the fluid.

As the flow enters the first supply passage 124, the flowpath 104 for cooling fluid rapidly contracts across the first supply passage. The average height of the pedestal Hp is less than forty percent of the average height of the rib Hr. This causes the flow area and hydraulic diameter of the flowpath to decrease rapidly. Again, the velocity of the flow and increases and the convective heat transfer coefficient increases.

The effect continues with the downstream height Hpd of the pedestal 108 being less than eighty percent (80%) of the upstream height of the pedestal Hpu to contract the area of the flowpath 104 through the pedestals. Again, the hydraulic diameter of the flowpath 104 decreases as the flow path passes between the pedestals. The relatively small downstream height of the pedestal also decrease the average height of the second supply passage 134.

The decreasing size of the flowpath 104 continues. The height Hfu of the flow divider 112 at the leading edge of the flow divider is less than ninety percent (90%) of the downstream height Hpd of the pedestal. This further decreases the average height of the second supply passage. In fact, the lateral height of the second supply passage Hsp2 (as measured along a line extending perpendicular to the spanwise distribution of the array of pedestals and the array of flow dividers), is equal to the height Hfu of the leading edge of the flow divider 112 over at least three fourths of the length of the second supply passage. This is made possible by locating the bulk of the second supply passage so far rearwardly that the interior surface of the suction wall and pressure wall are parallel and in close proximity to each other. As a result, the second supply passage has a low aspect ratio of width divided by height. The low aspect ratio causes a lowering of the hydraulic diameter and further increases the heat transfer coefficient to effectively use cooling fluid in this critical location of the airfoil.

One advantage using a design having a rib-spaced pedestal-spaced flow divider configuration is the ability to dispose the design in the laterally close (narrow) portion of the trailing edge region 76. The design makes this possible because the rib is made small to the extent permitted by casting consideration. The same considerations permit use of a pedestal smaller than the rib. Thus, the same casting consideration allow cylindrical pedestals and their spacing in the even tighter lateral space between the pressure wall and suction wall in close proximity to the flow dividers. Accordingly, a feature is the chordwise location of the heat transfer members one to the other, and their spacing from the trailing edge region between the rapidly converging pressure wall and suction wall of the rearmost portion of the airfoil.

A particular advantage of the rib-pedestal-flow divider configuration occurs during casting and during handling and use of the airfoil. The configuration provides for increased castability because the array of pedestals and the flow divider provide more core material in the trailing edge region during the casting process than does the rib. The increased core material is provided by core material disposed spanwisely between the array of adjacent pedestals to form the pedestal openings and core material disposed chordwisely and spanwisely between the array of flow dividers to form the channels. This increased material at the very end of the trailing dengue region provides support during the casting process and handling of the core for the airfoil before casting.

The rib and flow divider have a relatively larger mass of material than the pedestal in the finished turbine blade. During handling and processing of the airfoil after casting and during operative conditions, the impingement rib and the flow dividers cooperate with the pressure wall and suction wall to form a box-like structure for strengthening the trailing edge region of the airfoil. The pedestals are disposed chordwisely between the rib and dividers and reinforce the box-like structure.

One variable feature of the present embodiment that effects rearwardly locating the heat transfer members 106, 108,112 is the distance that the flow divider 112 extends upstream of the pressure wall lip 96. The leading edge 136 of the flow divider is spaced upstream from the pressure wall lip 96 by a length Ld,e. The length Ld,e is equal to the length Ld of the covered channel of the divider. The length Le is the length (radius) of the curved edge 136 of the flow divider.

The length Ld,e is less than one and one half times the length Lf of the uncovered diffusing section 152 downstream of the pressure wall lip 96. This places the second supply passage 134, the array of pedestals 108 and the first supply passage 124 in close proximity to the pressure wall lip 96 of the trailing edge region and between the rapidly converging pressure wall and suction wall. The length Lc is the length of the second supply passage. The length Ld, Le, and Lc extends from the pressure wall lip to the downstream side of the array of pedestals Pd and is less than three times the length Lf of the uncovered diffusing section 152.

Shortening the length Ld places the first supply passage 124 in proximity to the pressure wall lip 96 (trailing edge) and makes possible the rearward location of the film cooling passage 64. The film cooling passage extends from the first supply passage upstream of the pedestals to a location on the exterior of the pressure wall which is just downstream of the array of pedestals. On either side of the pedestal, the film cooling passage is less than a length of the diameter of the pedestal Dp away from the pedestal at the surfaces of the pressure wall.

The length to the film cooling passge at the exterior of the pressure wall is Lpfc. Lpfc is less than two and a half times the length Lf from the pressure wall lip. This provides a film of cooling fluid through film cooling holes at a location with respect to the pressure wall which is chordwisely aligned with the second supply passage.

As the cooling fluid exits the cutback trailing edge, the cooling fluid flows through the channels 66 defined by the spanwisely disposed flow dividers 112. Heat is transferred directly from the pressure wall 94 and suction wall 88 to the cooling fluid and indirectly through the flow dividers. The exiting cooling fluid first impinges upon the flow divider leading edge 136 to provide impingement type cooling of the flow divider and to indirectly transfer heat from the pressure wall and suction wall. The cooling fluid then passes through the channel 66 in which additional heat is transferred. The cooling fluid then enters the covered diffusing section 148 where the diffusing of the cooling fluid begins.

As the cooling fluid is diffused, the static pressure within the cooling fluid increases and the velocity of the cooling fluid decreases. The covered diffusing region permits the cooling fluid to begin diffusing before engaging with the working fluid flowing externally to the airfoil portion and over the suction surface lip. Upon exiting the covered diffusing region the cooling fluid continues diffusing over the suction surface lip and provides a film of cooling fluid over the suction surface lip. This film of cooling fluid provides a buffer between the hot working fluid and the suction surface lip and cools the suction surface wall. Beginning the diffusion upstream of the pressure surface lip and at velocities which are increased by reducing flow area provides means to initiate controlled diffusion before the diffusing cooling fluid exits the airfoil portion and is engaged by the hot working fluid flowing over the airfoil portion. Controlled diffusion upstream of the pressure lip results in an orderly and efficient diffusing film of cooling fluid over the suction surface lip.

The angled sides of the converging region form an angle $\alpha$ with a line parallel to the straight sides of the constant thickness section, as shown in FIG. 6. It is suggested that the diffusion angle $\alpha$ in a range of two degrees to ten degrees ($2° \leq \alpha < 10°$. Diffusion angles $\alpha$ less than two degrees ($2°$) may not provide sufficient diffusion and diffusion angles a greater than ten ($10°$) may result in flow separation from the angled sides depending upon other flow characteristics through the channels.

A particular advantage of the embodiment shown in FIG. 8 and FIG. 9 is the ability to have a greater angle of diffusion along the inwardly facing first converging sidewall 162, 176 than along the outwardly facing converging sidewalls 164, 178 of the adjacent flow divider. An angle $\alpha$ of two (2) degrees to about fifteen (15) degrees ($2° \leq \alpha \leq 15°$) is suggested with a smaller magnitude for the angle $\beta$. An angle $\beta$ for the outwardly facing second converging sidewall is suggested to lie in a range of one degree to twelve degrees ($1° \leq \beta \leq 12°$).

The difference in angles is made posssible by rotation of the rotor blade about the axis of rotation Ar. Rotation at the high angular velocities of a typical rotary machine causes the inwardly facing surface to exert a centripetal force on the cooling fluid as it passes through the channels 66. This centripetal force causes the fluid to exert an equal and opposite centrifugal force on the sidewall. These forces delay and even prevent separation of the flow as compared to equivalent flow at the same angle of diffusion on the outwardly facing sidewall. Alternatively, this enables greater diffusion on the outer, inwardly facing wall for a given rearward axial length. Thus, the same amount of diffusion may occur but in a shorter axial length Lf, and creates a shorter diffusing section 148,152.

A shorter, or more angled flow divider, has reduced mass which increases the ability of the flow divider to act as a heat transfer rib or fin. It also decreases the mass of material subjected to thermal gradients in the material and resulting thermal stresses. Accordingly angling the outer wall outwardly with an angle greater than the angle of the outwardly facing inner wall provides for more effective utilization of the cooling fluid and increased durability of the trailing edge region of the rotor blade.

Although the invention has been shown and described with respect with exemplary embodiments thereof, it should be understood by those skilled in the art that various changes, omissions, and additions may be made thereto, without departing from the spirit and scope of the invention.

We claim:

1. For an axial flow rotary machine which includes a turbine section having an annular flowpath for working medium gases and a rotor assembly having an axis of rotation Ar, a rotor blade having an airfoil disposed about a spanwise axis, the rotor blade having an opening which adapts the airfoil to be in flow communication with a source of cooling fluid under operative conditions, the airfoil having a leading edge region and a trailing edge region, the airfoil having an inner portion, an outer portion, and a mid-span portion that extends from the inner portion to the outer portion, the airfoil having a suction wall extending chordwisely and spanwisely about one side of the airfoil from the leading edge region to the trailing edge region and having a suction wall lip disposed in the trailing edge region, the airfoil having a pressure wall extending chordwisely and spanwisely about the opposite side of the airfoil from the leading edge region to the trailing edge region, the pressure wall being spaced laterally from the suction wall leaving a cavity for cooling fluid therebetween in flow communication with said opening and a flowpath for cooling fluid which extends through the trailing edge region to the suction wall lip, the pressure wall including a pressure wall lip, and wherein the suction wall lip and pressure wall lip define a trailing edge disposed in the trailing edge region, which comprises:

an internal passage for the flowpath for cooling fluid which extends spanwisely and is in flow communication with the opening for cooling fluid;

an array of flow dividers in flow communication with the internal passage for discharging cooling fluid into the working medium flowpath, each flow divider having at least a portion which extends from the pressure wall to the suction wall, each divider including a flow divider leading edge, a first converging sidewall which faces spanwisely inwardly and which is angled away from the direction of flow between flow dividers with an angle α as measured with respect to a line parallel to the axis Ar and a second converging sidewall which faces spanwisely outwardly and which is angled away from the direction of flow between flow dividers with an angle β as measured with respect to a line parallel to the axis Ar, the converging sidewalls forming a pair of sidewalls, the pair of converging sidewalls converging in the downstream direction such that spanwisely facing sidewalls of adjacent dividers diverge to define a diffusing section between adjacent dividers;

wherein the diffusing section extends from upstream to at least one of said lips; and, wherein the angle α of the inwardly facing sidewall is greater than the angle β of the outwardly facing sidewall; and, wherein the inwardly facing sidewall under operative conditions exerts a centripetal force on the flow enabling the first sidewall to provide a greater amount of diffusion without separation of the flow than the outwardly facing second sidewall.

2. The invention as claimed in claim 1 wherein the array of flow dividers includes a first flow divider and a second flow divider spaced outwardly from the first flow divider, wherein the first flow divider has a first converging sidewall having an angle α1 and wherein the second flow divider has a first converging sidewall having an angle α2 which is greater than the angle α1 of the first converging sidewall of the first flow divider.

3. The airfoil according to claim 1, wherein each flow divider further includes a pair of parallel sidewalls extending downstream from the flow divider leading edge to the converging sidewalls, each of the pair of parallel sidewalls being parallel with one of a first pair of side walls of an adjacent divider to define a constant area channel between adjacent dividers and immediately upstream of one of the diffusing sections.

4. The airfoil according to claim 1, wherein the flow divider leading edge is semi-circular in cross-section shape such that cooling fluid exiting the airfoil impinges upon the flow divider leading edge.

5. The airfoil according to claim 2 wherein the flow divider leading edge is semi-circular in cross-section shape such that cooling fluid exiting the airfoil impinges upon the flow divider leading edge.

6. The airfoil as claimed in claim 1 wherein the flow dividers have an upstream portion which extends from the pressure wall to the suction wall, wherein the pressure wall lip is axially upstream of the suction wall lip and wherein each of the pair of converging sidewalls extends to a point downstream of the pressure wall lip such that a portion of each of the dividers is not covered by the pressure wall which adapts the dividers to be exposed to the flow path under operative conditions and wherein the diffusing section extends from upstream of the pressure wall lip to downstream of the pressure wall lip.

7. The airfoil as claimed in claim 1, wherein the angle α of the inwardly facing surface lies in a range of two degrees to fifteen degrees ($2°\leq\alpha\leq15°$), and wherein the angle α of the outwardly facing second converging sidewall lies in a range of one degree to twelve degrees ($1°\leq\beta<12°$).

8. The airfoil as claimed in claim 1, wherein the angle α of the inwardly facing surface lies in a range of two degrees to fifteen degrees ($2°\leq\alpha\leq15°$), and wherein the angle β of the outwardly facing second converging sidewall lies in a range of one degree to twelve degrees ($1°\leq\beta<12°$).

9. The airfoil as claimed in claim 1 wherein both flow dividers are disposed in the midspan region of the airfoil.

* * * * *